Patented Nov. 10, 1953

2,658,892

UNITED STATES PATENT OFFICE 2,658,892

PREPARATION OF MELAMINE FROM BIURET

Joseph H. Paden, Stamford, and Johnstone S. Mackay, Old Greenwich, Conn., assignors to American Cyanamid Company, New York N. Y., a corporation of Maine No Drawing. Application July 28, 1951, Serial No. 239,182

2 Claims. (Cl. 260—249.7)

The present invention relates to the preparation of melamine from biuret.

It is an object of the invention to heat biuret under pressure to form melamine. It is a still further object to heat biuret under ammonia pressure to form melamine. More particularly it is an object of the invention to heat biuret at a temperature of at least 270° C. and under a pressure of at least 100 p. s. i. to produce melamine. Additional objects will be apparent from the following description of the invention.

The following examples illustrate without limiting the invention.

Example 1

35 grams of biuret was placed in a 300 cc. autoclave, which was then sealed and heated to 350° C. for two hours. The autoclave was then cooled, vented, and its contents removed and analyzed. Melamine was obtained in a yield of 55% based on the following equation:

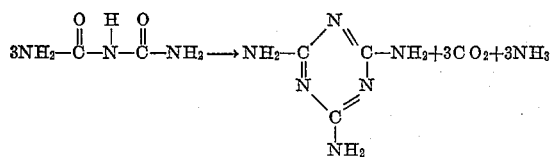

Any of the conventional methods of recovering melamine can be used. For example, the reaction mass can be dissolved in hot alkaline water, followed by cooling to precipitate melamine crystals.

Example 2

In a preferred embodiment of the invention ammonia is added to the biuret to inhibit melamine decomposition.

As illustrative of this modification, 51 grams of biuret was placed in a 300 cc. autoclave, to which was then added 25 grams of liquid ammonia. The autoclave was then sealed and heated to 300° C. for two hours. The autogenously developed pressure was approximately 3,000 p. s. i. At the end of the heating period, the contents of the autoclave were examined for melamine as in Example 1, and the yield, based on the equation in Example 1, was found to be 67%.

The amount of ammonia added is not critical, as the melamine yield is improved by relatively small amounts. It is preferred, however, that enough ammonia be used to provide a total pressure of at least 750 p. s. i. Greatly increased amounts of ammonia are not detrimental to the process as such, but merely represent an ammonia recovery problem.

In preparing melamine from biuret certain critical conditions must be borne in mind. As stated in S. N. 495,216, now Patent No. 2,566,231, of which the instant application is a continuation-in-part, the reaction must be carried out under a pressure of at least 100 p. s. i., part of which pressure can be ammonia pressure, and furthermore the temperature must be at least 270° C. The preferred pressure is approximately 750–5,000 p. s. i., and the preferred temperature is about 300 to 450° C. Considerably higher pressures and temperatures can be used, however. For example, pressures of 10,000 p. s. i. and even higher can be employed, the only limit on the pressure being the mechanical strength of the autoclave. The temperature can be as high as 600° C.

The time of reaction is not critical. If a continuous system is used in which the biuret can be rapidly heated, a reaction time of a few minutes is adequate, e. g., 2 minutes at 400° C. However, longer reaction times do not substantially affect the yield of melamine.

It is important that the reaction be carried out in the absence of added water, as water tends to decompose the melamine produced.

This is a continuation-in-part of applicants' co-pending Serial No. 495,216, filed July 17, 1943, now Patent Number 2,566,231.

While the invention has been described with particular reference to a specific embodiment, it is not to be understood to be limited thereby, but rather to be interpreted broadly and construed solely with reference to the appended claims.

We claim:

1. The process of preparing melamine from biuret which consists of heating biuret at a temperature in the range of 300–350° C. in a closed vessel under a pressure of at least 100 lbs. per sq. inch, until melamine is formed and recovering the so-formed melamine.

2. The process of claim 1 wherein said temperature is 350° C.

JOSEPH H. PADEN.
JOHNSTONE S. MACKAY.

References Cited in the file of this patent

UNITED STATES PATENTS

| Number | Name | Date |
|---|---|---|
| 2,550,659 | Vingee | Apr. 24, 1951 |

FOREIGN PATENTS

| Number | Country | Date |
|---|---|---|
| 598,175 | Great Britain | Feb. 18, 1948 |